(12) United States Patent
Choi et al.

(10) Patent No.: US 11,426,985 B2
(45) Date of Patent: Aug. 30, 2022

(54) POLYMER RESIN, WINDOW MODULE INCLUDING THE SAME, AND DISPLAY APPARATUS INCLUDING THE SAME

(71) Applicants: Samsung Display Co., LTD., Yongin-si (KR); DONG YANG INK CO.,LTD, Pyeongtaek-si (KR)

(72) Inventors: Ji Won Choi, Pyeongtaek-si (KR); Sangeun Moon, Suwon-si (KR); Dongho Kim, Hwaseong-si (KR); Sookkyung Yoo, Seoul (KR)

(73) Assignees: SAMSUNG DISPLAY CO., LTD., Gyeonggi-Do (KR); DONG YANG INK CO., LTD., Gyeonggi-Do (KR)

( * ) Notice: Subject to any disclaimer, the term of this patent is extended or adjusted under 35 U.S.C. 154(b) by 182 days.

(21) Appl. No.: 16/875,868

(22) Filed: May 15, 2020

(65) Prior Publication Data
US 2020/0361192 A1 Nov. 19, 2020

(30) Foreign Application Priority Data
May 16, 2019 (KR) .......................... 10-2019-0057417

(51) Int. Cl.
*B32B 27/30* (2006.01)
*B32B 38/14* (2006.01)
(Continued)

(52) U.S. Cl.
CPC .......... *B32B 27/308* (2013.01); *B32B 38/145* (2013.01); *C08F 212/08* (2013.01);
(Continued)

(58) Field of Classification Search
CPC ............... B32B 27/308; B32B 38/145; B32B 2307/416; B32B 2307/584; B32B 2307/714; B32B 2305/72; B32B 2457/20; C08F 220/281; C08F 220/325; C08F 220/1811; C08F 2800/10; C08K 3/30; C08K 2003/3045
(Continued)

(56) References Cited

U.S. PATENT DOCUMENTS 4,181,784 A * 1/1980 Chattha .............. C08G 59/3209
525/163
10,094,708 B2 10/2018 Jia et al.
(Continued)

FOREIGN PATENT DOCUMENTS

KR 1020140003046 A 1/2014
KR 1020160041153 A 4/2016
(Continued)

*Primary Examiner* — Michael M. Bernshteyn
(74) *Attorney, Agent, or Firm* — Cantor Colburn LLP (57) ABSTRACT

A window module including a window, a first print layer, an ink layer, and a protective layer covering the ink layer. The protective layer includes a polymer resin polymerized from monomers including a first monomer which is an acrylic monomer substituted with a hydroxy group, a second monomer having an epoxy group, and at least one of a third monomer having a substituted or unsubstituted phenyl group or a fourth monomer which is an acrylic monomer having a substituted or unsubstituted bicyclic alkyl group, and thus, has excellent durability, chemical resistance, and abrasion resistance.

16 Claims, 5 Drawing Sheets (51) Int. Cl.

| | |
|---|---|
| *C08F 212/08* | (2006.01) |
| *C08F 220/28* | (2006.01) |
| *C08F 220/32* | (2006.01) |
| *C08F 220/18* | (2006.01) |
| *C08K 3/30* | (2006.01) |
| *B32B 38/00* | (2006.01) |

(52) U.S. Cl.
CPC .... *C08F 220/1811* (2020.02); *C08F 220/281* (2020.02); *C08F 220/325* (2020.02); *C08K 3/30* (2013.01); *B32B 2305/72* (2013.01); *B32B 2307/416* (2013.01); *B32B 2307/584* (2013.01); *B32B 2307/714* (2013.01); *B32B 2457/20* (2013.01); *C08F 2800/10* (2013.01); *C08K 2003/3045* (2013.01)

(58) Field of Classification Search
USPC .......................................................... 428/442
See application file for complete search history.

(56) References Cited

U.S. PATENT DOCUMENTS

| | | | |
|---|---|---|---|
| 2016/0096966 A1 | 4/2016 | Chang | |
| 2018/0113350 A1* | 4/2018 | Jee | ................... C08J 7/0427 |
| 2018/0146564 A1* | 5/2018 | Wang | .................. H05K 5/0017 |
| 2018/0355185 A1 | 12/2018 | Gupta et al. | |

FOREIGN PATENT DOCUMENTS

| | | |
|---|---|---|
| KR | 1020160137862 A | 12/2016 |
| KR | 1020180057821 A | 5/2018 |

* cited by examiner

POLYMER RESIN, WINDOW MODULE INCLUDING THE SAME, AND DISPLAY APPARATUS INCLUDING THE SAME

CROSS-REFERENCE TO RELATED APPLICATIONS

This application claims priority to Korean Patent Application No. 10-2019-0057417, filed on May 16, 2019, and all the benefits accruing therefrom under 35 U.S.C. § 119, the content of which in its entirety is herein incorporated by reference.

BACKGROUND

When a failure occurs during a manufacturing process of a display apparatus, a rework process is required. The rework process may include a process of removing an adhesive layer disposed in a window module for bonding the window module and a display panel, and accordingly, a physical or chemical treatment may need to be performed on the surface of the window module. Such physical or chemical processes may cause problems such as damage or smearing of an ink layer and the like printed on the window module.

SUMMARY

The present disclosure provides a polymer resin having improved chemical resistance and abrasion resistance.

The present disclosure also provides a window module including a polymer resin having improved chemical resistance and abrasion resistance.

The present disclosure also provides a display apparatus including a window module having improved chemical resistance and abrasion resistance.

An embodiment of the inventive concept provides a window module including a window, a first print layer, an ink layer, and a protective layer. The first print layer may be disposed on the window and includes an opening to the window. The ink layer may fill the opening. The ink layer may include a base resin and at least one of a pigment or a dye dispersed in the base resin. The protective layer may cover the ink layer. The protective layer may include a polymer resin. The polymer resin may be polymerized from monomers including a first monomer, a second monomer, and at least one of a third monomer or a fourth monomer. The first monomer may be an acrylic monomer substituted with a hydroxy group. The second monomer may include an epoxy group. The third monomer may include a substituted or unsubstituted phenyl group. The fourth monomer may include a substituted or unsubstituted bicyclic alkyl group.

In an embodiment, the first monomer to the fourth monomer may be respectively represented by Formula 1 to Formula 4 below.

Formula 1

Formula 2

Formula 3

Formula 4

In Formula 1 to Formula 4 above, $R_1$, $R_5$, and $R_8$ may each independently be a hydrogen atom or a methyl group. Each $R_3$, $R_4$, and $R_7$ are independently a hydrogen atom or a methyl group. $R_2$ may be a hydroxy group or a hydroxymethyl group. Each $R_6$ may be a hydrogen atom, or a substituted or unsubstituted alkyl group having 1 to 5 carbon atoms.

In an embodiment, the second monomer may be represented by Formula 2-1 below.

Formula 2-1

In Formula 2-1 above, $R_9$ may be a hydrogen atom or a methyl group. $R_{10}$ may be a $-CH_2-$ or $-OCH_2-$ group.

In an embodiment, the polymer resin may include both the third monomer and the fourth monomer.

In an embodiment, the first monomer may include at least one of hydroxyethyl acrylate, hydroxyethyl methacrylate, and hydroxypropyl acrylate. The second monomer may include at least one of a bisphenol-A type epoxy monomer, glycidyl methacrylate, glycidyl acrylate, or allyl glycidyl ether. The third monomer may include at least one of isopropenyl benzene or t-butyl styrene. The fourth monomer may include at least one of isobornyl acrylate or isobornyl methacrylate. The polymer resin may be polymerized in the presence of a cross-linking agent.

In an embodiment, the amount of the cross-linking agent based on the total weight of the first monomer to the fourth monomer may be 20 weight percent (wt %) to 25 wt %.

In an embodiment, the cross-linking agent may include at least one of an isocyanate-based cross-linking agent or an amine-based cross-linking agent.

In an embodiment, the protective layer may include, based on the total moles of the first monomer to the fourth monomer, the first monomer in a range of 10 mole percent (mol %) to 30 mol %. The protective layer may include, based on the total of the first monomer to the fourth monomer, the second monomer in a range of 10 mol % to 30 mol %. The protective layer may include, based on the total of the first monomer to the fourth monomer, at least one monomer of the third monomer or the fourth monomer in a range of 50 mol % to 80 mol %.

In an embodiment, the polymer resin may further include inorganic particles. In an embodiment, the inorganic particles may be particles of barium sulfate.

In an embodiment, the visible light transmittance of the protective layer at a wavelength of 540 nm may be 99% or greater. The ink layer may include a first portion and a second portion. The first portion may fill the opening in the first print layer. The second portion may be extended from the first portion and disposed on the first print layer.

In an embodiment, the window module may further include a second print layer. The second print layer may be disposed on the first print layer. At least a portion of the second portion of the ink layer may be disposed between the first print layer and the second print layer.

In an embodiment, a display apparatus includes a window module, an infrared light detection sensor, and a display panel. The window module may have a bezel region and a transmissive region. The bezel region may have a semi-transmissive region through which infrared light is transmitted and a non-transmissive region surrounding the semi-transmissive region. The transmissive region may be adjacent to the bezel region. The infrared light detection sensor may overlap the semi-transmissive region. The display panel may overlap transmissive region and a portion of the bezel region. The window module may include a window, a first print layer, an ink layer, and a protective layer as described. The first print layer may be disposed in the non-transmissive region. The ink layer may be disposed in the semi-transmissive region. The ink layer may include a base resin and at least one of a pigment or a dye dispersed in the base resin. The protective layer may cover the ink layer. The protective layer may include a polymer resin. The polymer resin may be polymerized from monomers including a first monomer, a second monomer, and at least one of a third monomer or a fourth monomer. The first monomer may be an acrylic monomer substituted with a hydroxy group. The second monomer may include an epoxy group. The third monomer may include a substituted or unsubstituted phenyl group. The fourth monomer may include a substituted or unsubstituted bicyclic alkyl group.

In an embodiment, the first monomer to the fourth monomer may respectively be represented by Formula 1 to Formula 4 described above.

In an embodiment, the display apparatus may further include a second print layer disposed on the first print layer. The ink layer may include a first portion and a second portion. The first portion may be disposed in the semi-transmissive region. The second portion may be extended from the first portion and disposed in the non-transmissive region.

In an embodiment, the polymer resin may be polymerized in the presence of at least one of an isocyanate cross-linking agent or an amine-based cross-linking agent.

In an embodiment, a polymer resin is polymerized from monomers and a cross-linking agent. The monomers include a first monomer, a second monomer, a third monomer, and a fourth monomer. The cross-linking agent may include an isocyanate group or an amine group through which the crosslinking occurs. The first monomer, the second monomer, the third monomer, and the fourth monomer may respectively be represented by Formula 1 to Formula 4 described above.

In an embodiment, the first monomer may include at least one of hydroxyethyl acrylate, hydroxyethyl methacrylate, or hydroxypropyl acrylate. The second monomer may be a bisphenol-A type epoxy monomer. The third monomer may include at least one of isopropenyl benzene or t-butyl styrene. The fourth monomer may include at least one of isobornyl acrylate or isobornyl methacrylate.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. Also, in the drawings, the thickness, the ratio, and the dimensions of elements are exaggerated for an effective description of technical contents.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or," includes all combinations of one or more of which associated configurations may define.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "on," "upper," and the like are used to describe the relationship of the configurations shown in the drawings. The terms are used as a relative concept and are described with reference to the direction indicated in the drawings. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are interpreted as being expressly defined herein unless they are interpreted in an ideal or overly formal sense.

In an embodiment, a transmissive region transmits infrared light, but not as much visible light. For example, the transmissive region may exhibit greater than 80% at 900 nm, or greater than 60%, transmission at 1000 nm, but and less than 70%, or less than 50%, transmission of visible light at 540 nm.

In another embodiment, a transmissive region transmits visible light, but not as much infra-red light. For example, the transmissive region may exhibit greater than 90%, or greater than 80%, transmission of visible light at 540 nm, and less than 80% at 900 nm, or less than 60%, transmission at 1000 nm.

In another embodiment, a transmissive region transmits both infrared light and visible light. For example, the transmissive region may exhibit greater than 80% at 900 nm, or greater than 60%, transmission at 1000 nm, and greater than 70%, or greater than 50%, transmission of visible light at 540 nm.

The term "semi-transmissive" refers to a visible light transmission at 540 nm of from 40% to 70%. The term "semi-transmissive" can also refer to an infra-red light transmission at 1000 nm of from 40% to 70%.

The term "non-transmissive" refers to a visible light transmission at 540 nm of less than 40%, or less than 30%. The term "non-transmissive" can also refer to an infra-red light transmission at 1000 nm of less than 40%, or less than 30%.

It should be understood that the terms "comprises," "comprising," "includes," or "including," "has" or "have" are intended to specify the presence of stated features, integers, steps, operations, elements, components, or combinations thereof in the disclosure, but do not preclude the presence or addition of one or more other features, integers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Hereinafter, exemplary embodiments of the inventive concept will be described with reference to the accompanying drawings. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
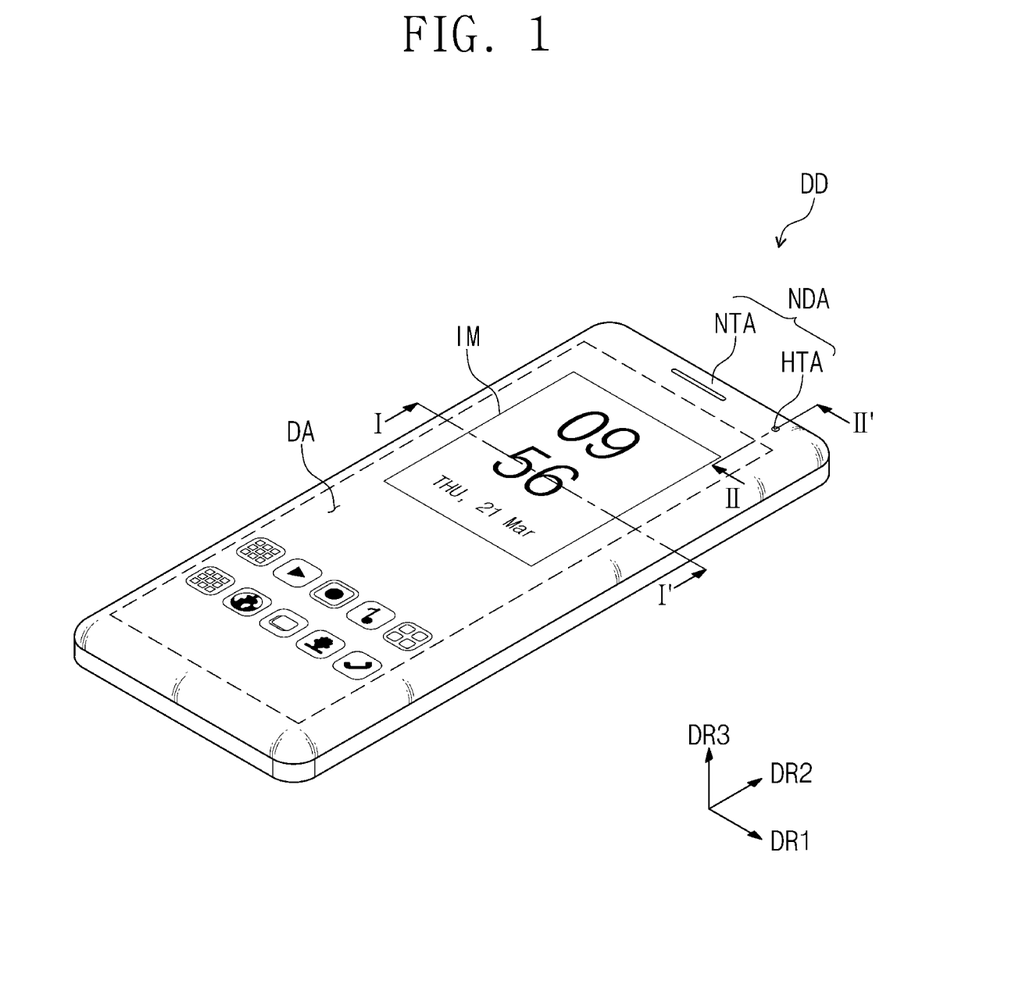
FIG. 1 is a perspective view of a display apparatus according to an embodiment of the inventive concept.
Figure 2:
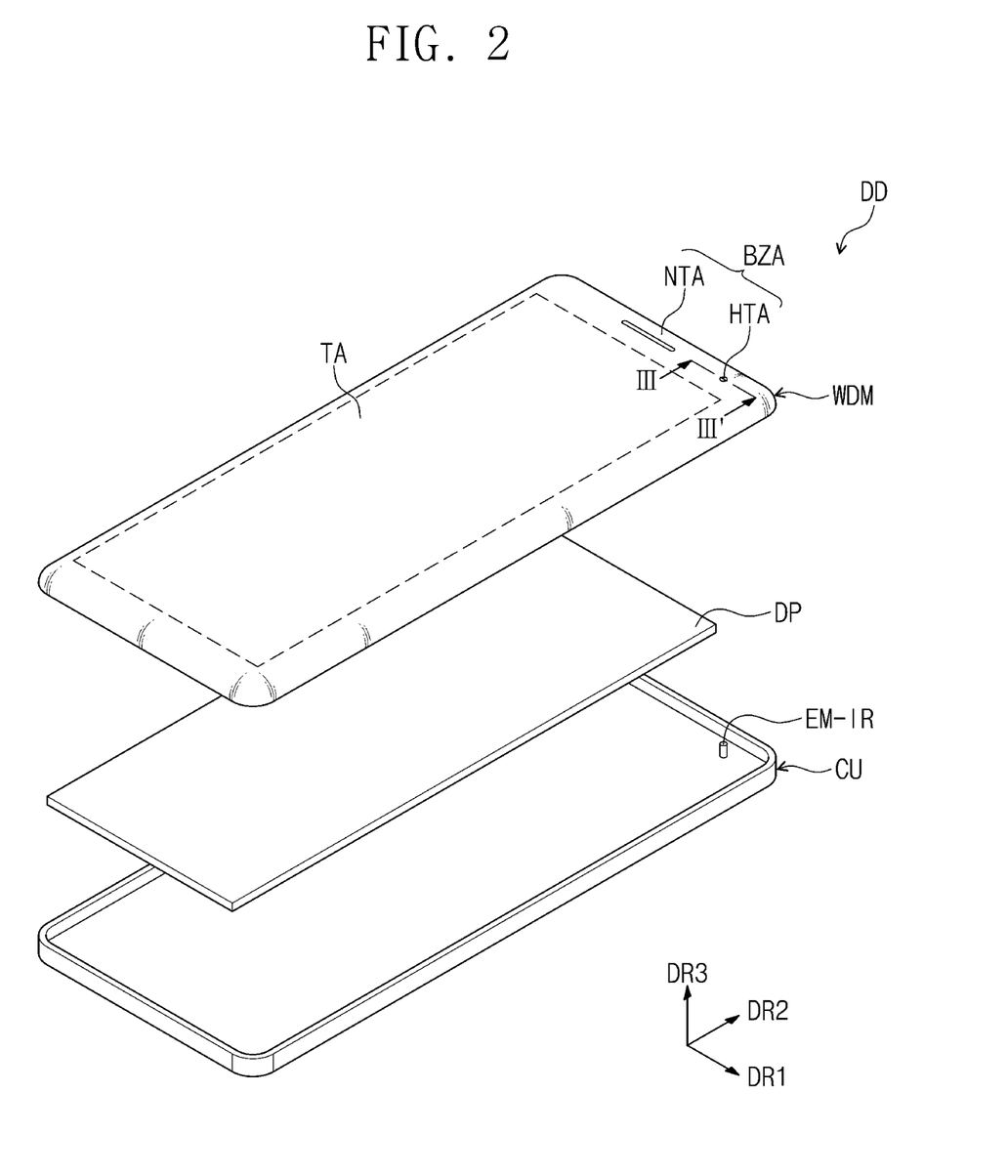
FIG. 2 is an exploded perspective view of a display apparatus according to an embodiment of the inventive concept.

FIG. 1 is a perspective view of a display apparatus DD according to an embodiment of the inventive concept. FIG. 2 is an exploded perspective view of the display apparatus DD according to an embodiment of the inventive concept.

In FIG. 1, a portable terminal provided with curved edges of four sides is exemplarily illustrated as the display apparatus DD. However, the embodiment of the inventive concept is not limited thereto, and may be applied to various display apparatuses DD such as a flat-type display apparatus, a curved display apparatus, a bending-type display apparatus, a rollable display apparatus, a foldable display apparatus, and a stretchable display apparatus. In addition, although not separately illustrated, the display apparatus DD according to the inventive concept may be used for large electronic devices such as a television or an external advertisement board, and also for small and medium-sized electronic devices such as a personal computer, a laptop computer, a personal digital terminal, a car navigation unit, a game machine, a portable electronic device, a wristwatch-type electronic device, and a camera. It should be understood that these are merely exemplary embodiments, and the display apparatus DD may be employed in other electronic devices without departing from the inventive concept.

The display apparatus DD includes a plurality of regions separated on a display surface. The display apparatus DD may include a display region DA on which images IM are displayed and a non-display region NDA adjacent to the display region DA. In FIG. 1, as an example of the image IM, a watch widget is illustrated. The non-display region NDA may surround the display region DA. The display apparatus DD may include a bezel region BZA. The non-display region NDA may include a semi-transmissive region HTA and a non-transmissive region NTA surrounding the semi-transmissive region HTA, and the details of the non-display region NDA will be described later.

In the present embodiment, a front surface (or an upper surface) and a back surface (or a lower surface) of each member are defined on the basis of a direction in which the image IM is displayed. The front surface and the back surface oppose each other in a third direction DR3 and the normal direction of each of the front surface and the back surface may be parallel to the third direction DR3. Meanwhile, directions indicated by the first to third directions DR1, DR2, and DR3 are a relative concept, and may be converted to different directions. Hereinafter, first to third directions are directions indicated by the first to third directions DR1, DR2, and DR3, respectively, and are given the same reference numerals. In the present disclosure, "on a plane" may mean when viewed in the third direction DR3, that is, from a normal direction.

Referring to FIG. 2, the display apparatus DD may include a window module WDM, a display panel DP, an infrared light detection sensor EM-IR, and a housing CU.

The window module WDM protects the display panel DP from external impact, and may provide an input surface to a user. The window module WDM may include glass or plastic. The window module WDM may have transparent properties such that light generated in the display panel DP may be transmitted therethrough. The window module WDM may be a rigid substrate or a flexible substrate.

The window module WDM may include a bezel region BZA and a transmissive region TA adjacent to the bezel region BZA. The bezel region BZA may surround the transmissive region TA. The bezel region BZA may be a region corresponding to the non-display region NDA of FIG. 1, and the transmissive region TA may be a region corresponding to the display region DA of FIG. 1. However, the embodiment of the inventive concept is not limited thereto. The bezel region BZA and the non-display region NDA are not necessarily the same, and the transmissive region TA and the display region DA are not necessarily the same.

The display panel DP may generate the image IM. In an embodiment, the display panel DP may be a light emitting type display panel, but the embodiment of the inventive concept is not particularly limited thereto. For example, the display panel DP may be an organic light emitting display panel, a quantum dot light emitting display panel, a plasma display panel, an electrophoretic display panel, or an electrowetting display panel. A light emitting layer of an organic light emitting display panel may include an organic light emitting material. A light emitting layer of a quantum dot light emitting display panel may include a quantum dot, a quantum load, and the like. Hereinafter, the display panel DP will be described as an organic light emitting display panel.

The infrared light detection sensor EM-IR may not overlap the display panel DP on a plane. That is, the infrared light detection sensor EM-IR may be received as a separate electronic apparatus. However, the embodiment of the inventive concept is not limited thereto. The infrared light detection sensor EM-IR may be integrally included in the display panel DP.

Although not illustrated, the infrared light detection sensor EM-IR may include, for example, an emitting unit (not shown) for emitting infrared light and a light receiving unit (not shown) for receiving infrared light. When infrared light emitted from the emitting unit is reflected from an external object, the light receiving unit may receive the reflected light and generate an electric signal. For example, the infrared light detection sensor EM-IR may be a biometric sensor such as an iris recognition sensor.

The display apparatus DD may further include an electronic module such as a camera module (not shown) and a proximity sensor module (not shown) in addition to the infrared light detection sensor EM-IR.

The housing CU receives the display panel DP and the infrared light detection sensor EM-IR, and may be coupled to a window WD. The housing CU may include a plurality of parts that are assembled, or one injection molded body. The housing CU may include glass, plastic, or metal.

Figure 3:
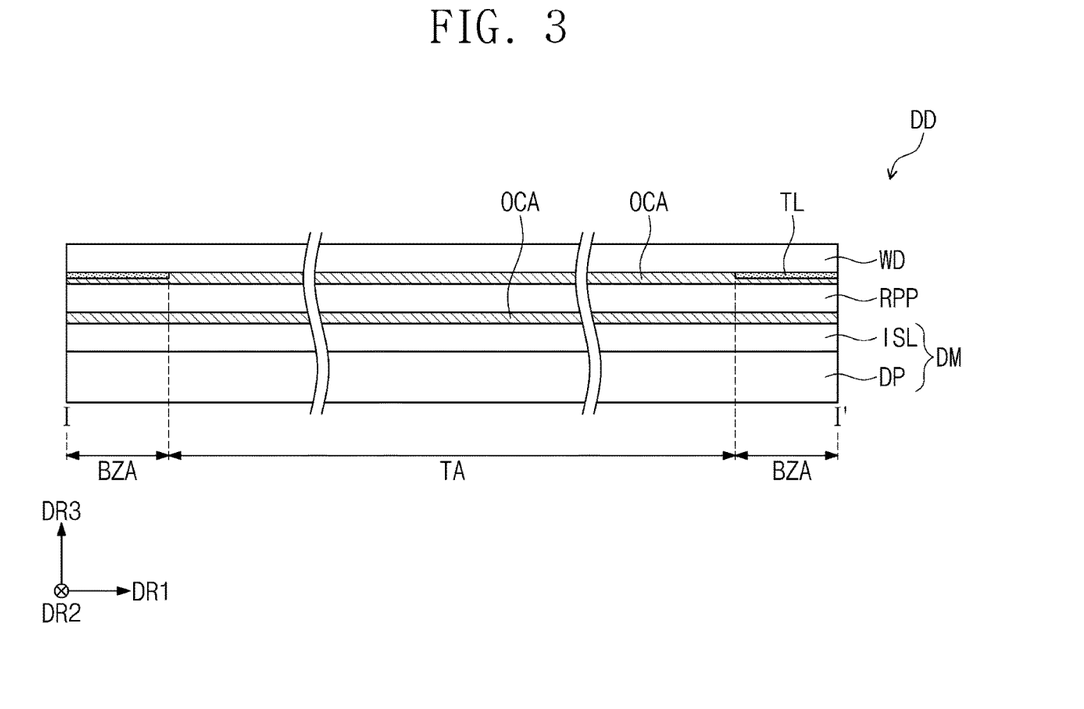
FIG. 3 is a cross-sectional view of a display apparatus taken along line I-I' of FIG. 1.

FIG. 3 is a cross-sectional view of the display apparatus DD taken along line I-I' of FIG. 1. FIG. 3 is simply illustrated to describe the lamination relationship of functional members constituting the display apparatus DD.

As illustrated in FIG. 3, the display apparatus DD may include the display panel DP, an input sensing layer ISL, a reflection prevention panel RPP, and the window WD. The input sensing layer ISL may be disposed directly on the display panel DP. In the present disclosure, "A component of B is directly disposed on a component of A" means that no separate adhesive layer/adhesive member is disposed between the component of A and the component of B. The component of B may be formed through a continuous process on a base surface provided by the component of A after the component of A is formed.

The display module DM may be defined by including the display panel DP and the input sensing layer ISL disposed directly on the display panel DP. Between the display module DM and the reflection prevention panel RPP, and between the reflection prevention panel RPP and the window WD, an optical transparent adhesive member is disposed. The adhesive member may be an optical transparent adhesive member OCA.

The display panel DP generates an image and the input sensing layer ISL obtains coordinate information of an external input (for example, a touch event). Although not separately illustrated, the display module DM according to an embodiment of the inventive concept may further include a protective member disposed on a lower surface of the display panel DP. The protective member and the display panel DP may be coupled through the adhesive member.

The reflection prevention panel RPP reduces the reflectance of external light incident from an upper side of the window WD. The reflection prevention panel RPP according to an embodiment of the inventive concept may include a phase retarder and a polarizer. The phase retarder may be a film type or a liquid crystal coating type, and may include a $\lambda/2$ phase retarder and/or a $\lambda/4$ phase retarder. The polarizer is also a film type, and may include a stretchable synthetic resin film. The phase retarder and the polarizer may further include a protective film. The phase retarder and the polarizer themselves or the protective film may be defined as a base layer of the reflection prevention panel RPP.

The reflection prevention panel RPP according to an embodiment of the inventive concept may include color filters. The color filters have a predetermined arrangement. The arrangement of the color filters may be determined in consideration of the light emitting colors of pixels included in the display panel DP. The reflection prevention panel RPP may further include a black matrix adjacent to the color filters.

Figure 4:
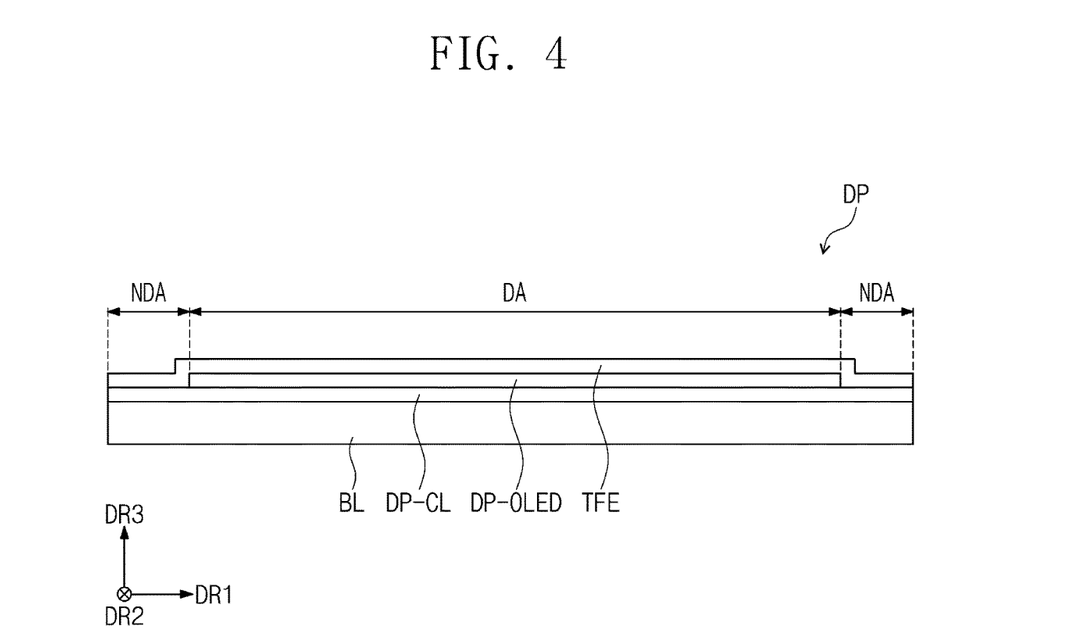
FIG. 4 is a cross-sectional view of a display panel according to an embodiment of the inventive concept.

FIG. 4 is a cross-sectional view of the display panel DP according to an embodiment of the inventive concept. In FIG. 4, the display panel DP is illustrated as an organic light emitting display panel. Referring to FIG. 4, the display panel DP includes a base substrate BL, a circuit element layer DP-CL, a display element layer DP-OLED, and an encapsulation layer TFE. Although not separately illustrated, the display panel DP may further include a functional layer such as a reflection prevention layer and a refractive index control layer.

The base substrate BL may be a glass substrate, a silicon substrate, a plastic substrate, an insulation film, or a laminated structural body including a plurality of insulation layers.

The circuit element layer DP-CL may be disposed on the base substrate BL. The circuit element layer DP-CL includes at least one insulation layer and a circuit element. Hereinafter, an insulation layer included in the circuit element layer DP-CL is referred to as an intermediate insulation layer. The intermediate insulation layer includes at least one intermediate inorganic film and at least one intermediate organic film. The circuit element includes a signal line and a driving circuit of a pixel, and the like. The circuit element layer DP-CL may be formed through a forming process of an insulation layer, a semiconductor layer, and a conductive layer by coating, deposition, and the like, and a patterning process of an insulation layer, a semiconductor layer, and a conductive layer by a photolithography process.

The display element layer DP-OLED may be disposed on the circuit element layer DP-CL. The display element layer DP-OLED includes a light emitting element. The display element layer DP-OLED may include organic light emitting diodes. The display element layer DP-OLED may include an organic film such as a pixel definition film.

The encapsulation layer TFE is disposed on the display element layer DP-OLED and encapsulates the display element layer DP-OLED. The encapsulation layer TFE includes at least one insulation layer. The encapsulation layer TFE according to an embodiment of the inventive concept may include at least one inorganic film (hereinafter, an encapsulation inorganic film). The encapsulation layer TFE according to an embodiment of the inventive concept may include at least one organic film (hereinafter, an encapsulation organic film) and at least one encapsulation inorganic film.

The encapsulation inorganic film protects the display element layer DP-OLED from moisture/oxygen and the encapsulation organic film protects the display element layer DP-OLED from foreign materials such as dust particles. The encapsulation inorganic film may include a silicon nitride layer, a silicon oxynitride layer, a silicon oxide layer, a titanium oxide layer, or an aluminum oxide layer, and the like, but is not particularly limited thereto. The encapsulation organic film may include an acrylic organic film, but is not particularly limited thereto. The input sensing layer ISL (FIG. 3) illustrated in FIG. 3 may be disposed directly on the encapsulation layer TFE.

Figure 5:
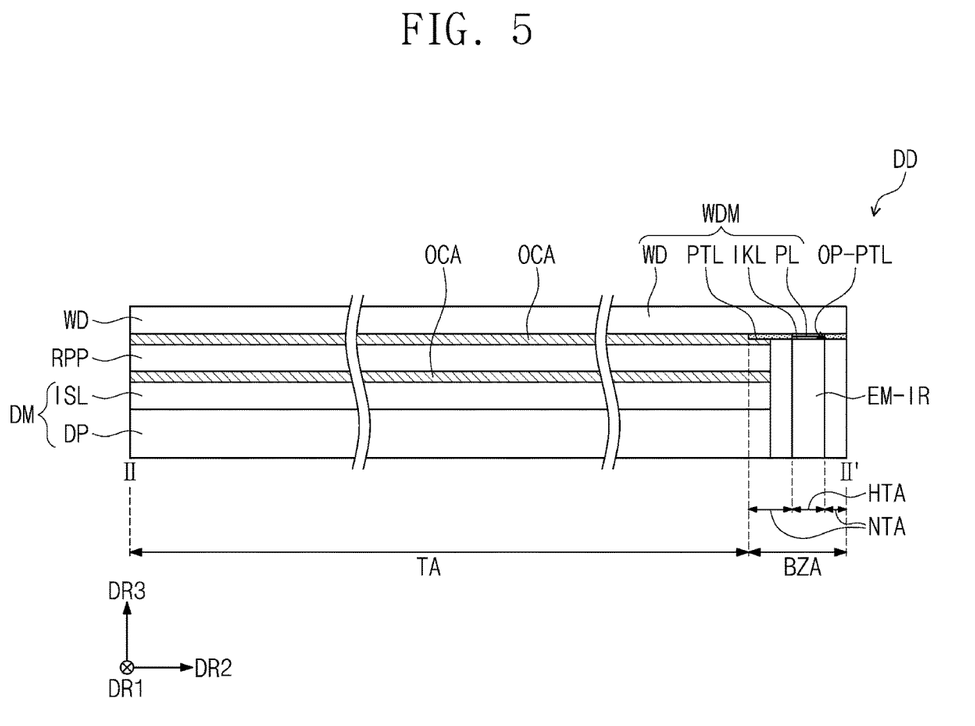
FIG. 5 is a cross-sectional view of a display apparatus taken along line II-II' of FIG. 1.

FIG. 5 is a cross-sectional view of the display apparatus DD taken along line II-II' of FIG. 1. Referring to FIG. 5, the window module WDM may include the window WD, a print layer PTL, an ink layer IKL, and a protective layer PL.

The print layer PTL may be disposed on the window WD. On the print layer PTL, an opening OP-PTL may be defined. The print layer PTL may define the bezel region BZA. That is, a portion of the bezel region BZA in which the print layer PTL is disposed may be defined as the non-transmissive region NTA, and a portion in which the opening OP-PTL is defined may be defined as the semi-transmissive region HTA.

The print layer PTL may include a shielding ink layer for shielding light. For example, a shielding ink layer may include a base material and a shielding ink. A shielding ink may be carbon black particles. However, the embodiment of the inventive concept is not limited thereto. A shielding ink may include one or more known pigments, dyes, or mixtures thereof in addition to carbon black particles. The print layer PTL may prevent configurations inside the display apparatus DD from being visually recognized to the outside.

The ink layer IKL is disposed on the window WD, and may fill the opening OP-PTL. The ink layer IKL may include a base resin and at least one of a pigment or a dye dispersed in the base resin. The ink layer IKL may define the semi-transmissive region HTA.

The ink layer IKL includes a pigment or a dye, and thus, may have a color. Accordingly, the infrared light detection sensor EM-IR received inside the display apparatus DD may not be visually recognized to the outside.

The ink layer IKL may selectively transmit infrared light between visible light and infrared light. That is, the ink layer IKL absorbs visible light, and may transmit infrared light. For example, the ink layer IKL may absorb 90% or greater of visible light, and may transmit 80% or greater, or 90% or greater of infrared light. Accordingly, infrared light emitted from the infrared light detection sensor EM-IR is emitted through the ink layer IKL to the outside, and infrared light reflected by an external material may reach the infrared light detection sensor EM-IR through the ink layer IKL. On the other hand, most of visible light is absorbed by the ink layer IKL, so that the sensitivity of the infrared light detection sensor EM-IR may be improved.

At least one of a base resin, a pigment, and a dye included in the ink layer IKL may absorb visible light and may transmit infrared light.

The protective layer PL may be disposed between the window WD and the ink layer IKL. The protective layer PL may cover the ink layer IKL. The protective layer PL may be disposed directly on the ink layer IKL to cover the ink layer IKL.

The infrared light detection sensor EM-IR may overlap the semi-transmissive region HTA. Although not illustrated, a portion of the infrared light detection sensor EM-IR may overlap the non-transmissive region NTA.

The protective layer PL may have a visible light transmittance of 99% or greater. The weight average molecular weight of a polymer resin may be 20,000 to 40,000 grams per mole (g/mol). Specifically, the weight average molecular weight of the polymer resin may be 20,000 to 30,000 g/mol.

The protective layer PL may include a polymer resin polymerized from monomers including a first monomer, a second monomer, and a third monomer or a fourth monomer. That is, the polymer resin includes the first monomer and the second monomer, and may include at least one of the third monomer or the fourth monomer. Preferably, the polymer resin may include all of the first monomer to the fourth monomer.

The first monomer may be an acrylic monomer substituted with a hydroxy group. The second monomer may be a monomer including an epoxy group. For example, the second monomer may be an acrylic monomer including an epoxy group. The third monomer may be a monomer including a substituted or unsubstituted phenyl group. The fourth monomer may be an acrylic monomer including a bicyclic alkyl group. Each of the first monomer to the fourth monomer may include an alkenyl group.

A polymer resin polymerized with monomers including the third monomer and the fourth monomer may have a glass transition temperature of 80° C. to 140° C. Specifically, a polymer resin polymerized with monomers including 50 mol % to 80 mol % of at least one monomer of the third monomer or the fourth monomer may have a glass transition temperature of 80° C. to 140° C. For example, a polymer resin having a glass transition temperature of 90° C. to 130° C. may be polymerized with a monomer including the third monomer and the fourth monomer.

The first monomer to the fourth monomer may be respectively represented by Formula 1 to Formula 4 below.

Formula 1

Formula 2

-continued

Formula 3

Formula 4

In Formula 1 to Formula 4 above, $R_1$, $R_5$, and $R_8$ may each independently be a hydrogen atom or a methyl group. Each $R_3$, $R_4$, and $R_7$ are independently a hydrogen atom or a methyl group. $R_2$ may be a hydroxy group or a hydroxymethyl group. Each $R_6$ may be a hydrogen atom, or a substituted or unsubstituted alkyl group having 1 to 5 carbon atoms. For example, if $R_6$ is a substituted or unsubstituted alkyl group, $R_6$ may be a methyl group, an ethyl group, an n-propyl group, an isopropyl group, an n-butyl group, an isobutyl group, or a t-butyl group.

The second monomer may be represented by Formula 2-1 below.

Formula 2-1

In Formula 2-1 above, $R_9$ may be a hydrogen atom or a methyl group. $R_{10}$ may be a —$CH_2$— group or an —$OCH_2$— group.

The first monomer may include at least one of hydroxy ethyl acrylate (HEA), hydroxy ethyl methacrylate (HEMA), or hydroxy propyl acrylate (HPA).

The second monomer may include at least one of a bisphenol-A type epoxy monomer, glycidyl methacrylate, glycidyl acrylate, or allyl glycidyl ether.

The bisphenol-A type epoxy monomer may be formed by reacting a bisphenol-A epoxy derivative below with acrylic acid. The bisphenol-A type epoxy monomer may be formed by reacting one epoxy group of a bisphenol-A epoxy derivative having two epoxy groups with acrylic acid. For example, the bisphenol-A type epoxy monomer may be formed through a reaction below.

The bisphenol-A type epoxy monomer may be, for example, 2-hydroxy-3-(4-(2-(4-(oxiran-2-yloxy)phenyl)propan-2-yl)phenoxy)propyl acrylate.

The third monomer may include at least one of isopropenyl benzene or t-butyl styrene. The fourth monomer may include at least one of isobornyl acrylate (IBOA), or isobornyl methacrylate (IBOMA).

Preferably, the first monomer may be, among the first monomers described above, hydroxyethyl methacrylate forming a polymer having a high glass transition temperature during polymerization.

The first monomer includes a hydroxy group, and thus, enables the formation of cross-linking when a cross-linking agent is added. Accordingly, a polymer resin of an embodiment includes the first monomer, so that durability may be improved.

Since the second monomer includes an epoxy group which improves the strength of a cross-linking structure, the polymer resin of an embodiment may have excellent durability by including the second monomer.

The third monomer and the fourth monomer respectively include a bicyclic group and a phenyl group, and thus, have good durability against a chemical material and have a high glass transition temperature. Accordingly, the polymer resin of an embodiment includes the third monomer and the fourth monomer, and thus, may have excellent chemical resistance and abrasion resistance.

The polymer resin may be polymerized in the presence of a cross-linking agent in addition to the first monomer to the fourth monomer described above. The cross-linking agent may be a bifunctional cross-linking agent. The cross-linking agent may be at least one of an isocyanate cross-linking agent or an amine cross-linking agent.

The isocyanate crosslinking agent, referred to as an isocyanate-based cross-linking agent may be a diisocyanate-based cross-linking agent. The diisocyanate-based cross-linking agent may form cross-linking by coupling hydroxide groups of two first monomer units from two different main chain polymers. For example, an isocyanate group of the diisocyanate-based cross-linking agent and a hydroxyl group of the first monomer unit may react to form a urethane group by cross-linking. The diisocyanate-based cross-linking agent may be isophorone diisocyanate (IPDI), toluene diisocyanate (TDI), or hexamethylene diisocyanate (HDI), but the embodiment of the inventive concept is not limited thereto is not limited thereto. For example, alternatively, as the isocyanate-based cross-linking agent, a 3-functional group isocyanate-based cross-linking agent may be used instead of the diisocyanate-based cross-linking agent. For example, as the isocyanate-based cross-linking agent, a triisocyanate-based cross-linking agent may be used. At this time, the added amount of the triisocyanate-based cross-linking agent may be less than that of the diisocyanate-based cross-linking agent.

The amine crosslinking agent, referred to as an amine-based cross-linking agent may have a plurality of functional groups. For example, the amine-based cross-linking agent may have two or more amine groups. Specifically, the amine-based cross-linking agent may be diethylenetriamine (DETA) having three amine groups, or triethylenetetramine (TETA) having four amine groups. However, the embodiment of the inventive concept is not limited thereto.

In a step of mixing the first monomer to the fourth monomer with an amine-based cross-linking agent, a hydroxy group of the first monomer or an epoxy group of the second monomer may react with the amine-based cross-linking agent to form cross-linking. Specifically, a hydroxy group of the first monomer and an amine group of the amine-based cross-linking agent may react with each other to form a urea group by cross-linking.

In an embodiment, in order to control the rate of cross-linking during polymerization to form a suitable cross-linking, a functional group of a cross-linking agent may be treated with a protection group through a protection reaction. For example, an isocyanate-based cross-linking agent may be treated with a protection group. A polymerization reaction may occur actively at a high temperature above room temperature, and a protection group of a cross-linking agent may be released by a deprotection reaction when a specific temperature at which the polymerization reaction actively occurs is reached. Therefore, before a reaction temperature is reached, it is possible to prevent or minimize a phenomenon in which a cross-linking agent having a higher reaction rate than the first monomer to the fourth monomer pre-reacts.

The cross-linking agent of an embodiment forms cross-linking as described above such that the polymer resin may have a high cross-linking density. Accordingly, the coating film strength, durability, and barrier properties of the polymer resin may be improved.

The polymer resin may include, based on the total moles of the first monomer to the fourth monomer, the first monomer in a range of 10 mol % to 30 mol %, the second monomer in a range of 10 mol % to 30 mol %, and at least one monomer of the third monomer or the fourth monomer in a range of 50 mol % to 80 mol %. Preferably, the polymer resin may include, based on the total moles of the first monomer to the fourth monomer, the first monomer in a range of 15 mol % to 25 mol %, the second monomer in a range of 15 mol % to 25 mol %, and at least one monomer of the third monomer or the fourth monomer in a range of 60 mol % to 70 mol %.

When the ratio of the first monomer is less than 10 mol %, the number of hydroxy groups capable of cross-linking is reduced, so that the cross-linking density of the polymer resin may be lowered. Accordingly, the abrasion resistance and barrier properties of the protective layer PL may be deteriorated. Since the glass transition temperature of the first monomer is lower than those of the third monomer and the fourth monomer, when the ratio of the first monomer is greater than 30 mol %, the total glass transition temperature of the polymer resin may be lowered, thereby deteriorating the abrasion resistance of the protective layer PL.

When the amount of the second monomer is less than 10 mol %, the hardness of the polymer resin may become excessive. Accordingly, the protective layer PL may be easily damaged even by minimal impact. When the amount of the second monomer is greater than 40 mol %, a yellowing phenomenon may occur to the polymer resin. Accordingly, the protective layer PL may be visually recognized as yellow from the outside.

The third monomer and the fourth monomer have a phenyl group or a bicyclic alkyl group, and thus, have a high glass transition temperature and excellent chemical resistance. When the amount of at least one of the third monomer or the fourth monomer is 50 mol % or less, the scratch resistance and chemical resistance of the polymer resin may exhibit deterioration. When the amount of at least one of the third monomer or the fourth monomer is 80 mol % or greater, the hardness of the polymer resin may become too excessive. Accordingly, the protective layer PL may be easily damaged even by minimal impact.

Preferably, the polymer resin may include both the third monomer and the fourth monomer. At this time, based on the total moles of the first monomer to the fourth monomer, the amount of the third monomer and the amount of the fourth monomer may be 25 mol % to 40 mol %, respectively. Preferably, based on the total moles of the first monomer to the fourth monomer, the amount of the third monomer and the amount of the fourth monomer may be 30 mol % to 35 mol %, respectively.

Based on the total weight of the first monomer to the fourth monomer, the amount of the added cross-linking agent may be 20 wt % to 25 wt %. For example, when 100 g of the first monomer to the fourth monomer is added, 20 g to 25 g of the cross-linking agent may be added. In the present disclosure, wt % may mean mass %.

When the cross-linking agent is added in an amount of 20 wt % or less, the cross-linking density of the polymer resin may be lowered. Accordingly, the abrasion resistance and barrier properties of the protective layer PL may be unacceptable or exhibit deterioration. When the cross-linking agent is added in an amount of 25 wt % or greater, the transmittance of the polymer resin may be unacceptable or exhibit deterioration.

The polymer resin according to an embodiment of the inventive concept may further include an anti-foaming agent. Specifically, the anti-foaming agent minimizes bubbles generated in a composition to prevent, reduce, or minimize an appearance defect from occurring when forming a coating film. The anti-foaming agent may be a silicone-based anti-foaming agent.

The polymer resin may further include inorganic particles. The inorganic particles may also minimize bubbles generated in a composition to prevent or minimize an appearance defect from occurring when forming a coating film. For example, barium sulfate may remove a hole generated by the clumping of polymer resins. Preferably, barium sulfate may be included as inorganic particles. Barium sulfate has excellent chemical resistance and heat resistance. In an embodiment, based on the total weight of the first monomer to the fourth monomer and the cross-linking agent, the inorganic particles may be included in an amount of 1 wt % to 3 wt %. When the amount of inorganic particles is in the above-described range, it is possible to have excellent coating film properties without affecting the transmittance of the polymer resin.

Figure 6:
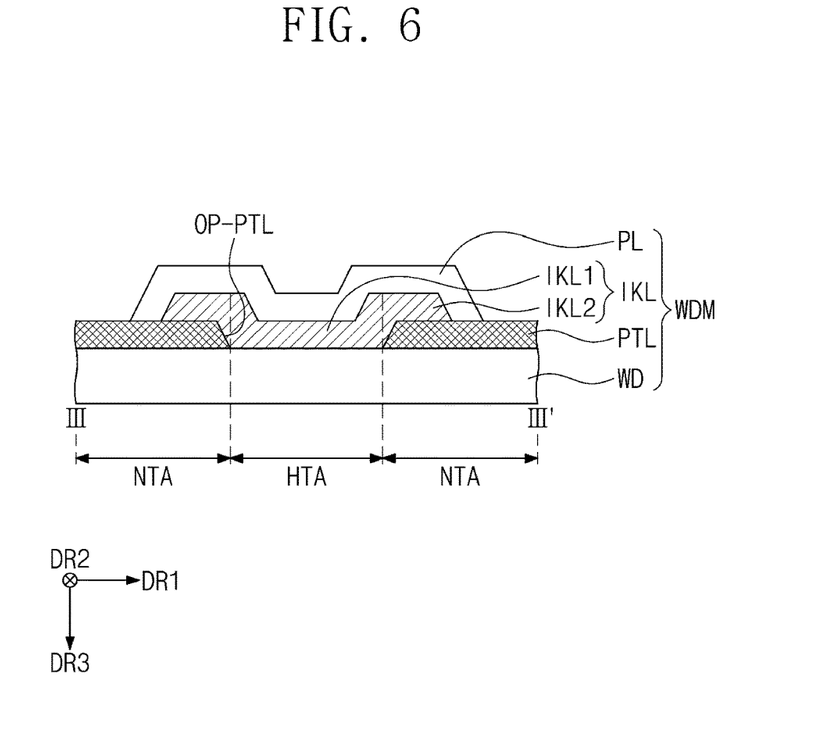
FIG. 6 is a cross-sectional view of a window module taken along line III-III' of FIG. 2.
Figure 7:
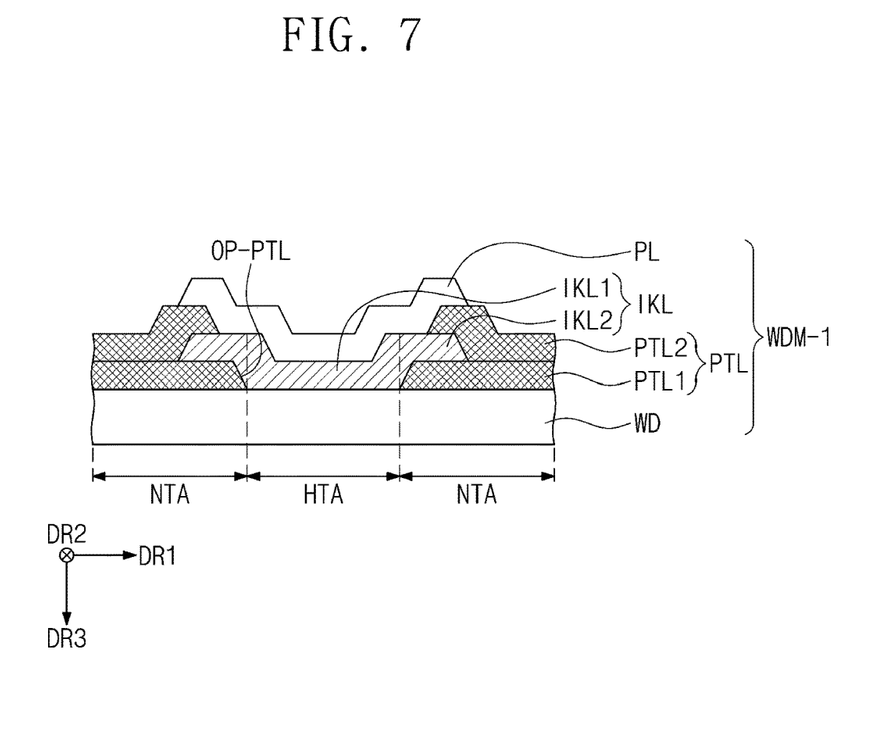
FIG. 7 is a cross-sectional view of a window module corresponding to a plane taken along line III-III' of FIG. 2.

FIG. 6 is a cross-sectional view of the window module WDM taken along line III-III' of FIG. 2. FIG. 7 is a cross-sectional view of a window module WDM-1 corresponding to a plane taken along line of FIG. 2.

Referring to FIG. 6, in the window module WDM, the print layer PTL may be a single layer. However, the embodiment of the inventive concept is not limited thereto. The print layer PTL may have a structure in which a plurality of layers is laminated.

The ink layer IKL may include a first portion IKL1 and a second portion IKL2. The first portion IKL1 may fill the opening OP-PTL. The second portion IKL2 may be extended from the first portion IKL1 and disposed on the print layer PTL. The first portion IKL1 and the second portion IKL2 may have an integral shape. The protective layer PL may be disposed to cover the ink layer IKL. The protective layer PL may be disposed directly on the ink layer IKL to cover the ink layer IKL. A portion of the protective layer PL may be disposed on the print layer PTL.

In FIG. 7, in the window module WDM-1, the print layer PTL is exemplarily illustrated as being composed of two layers. The print layer PTL may include a first print layer PTL1 and a second print layer PTL2. At least a portion of the second portion IKL2 of the ink layer IKL may be disposed between the first print layer PTL1 and the second print layer PTL2.

A portion of the protective layer PL is disposed directly on the ink layer IKL, and a portion of the protective layer PL may be disposed on the second print layer PTL2.

Referring to FIG. 6 and FIG. 7, in a manufacturing process of the window module WDM, the print layer PTL, the ink layer IKL, and the protective layer PL may be sequentially laminated. When the print layer PTL includes the first print layer PTL1 and the second print layer PTL2, in a manufacturing process of the window module WDM-1, the first print layer PTL1, the ink layer IKL, the second print layer PTL2, and the protective layer PL may be sequentially laminated.

When a defect occurs during a manufacturing process of the display apparatus DD, a rework process is required in order to reduce processing costs. At this time, in order to remove an adhesive layer disposed on the window module WDM, physical rubbing using a dust free cloth and chemical rubbing through alcohol cleaning are performed simultaneously. At this time, the ink layer IKL may be damaged to cause defects such as the smudging of a pigment or a dye included in the ink layer IKL.

The window module WDM according to an embodiment includes the protective layer PL including a polymer resin, and thus, may prevent damage to the ink layer IKL during a rubbing process. Particularly, the protective layer PL according to an embodiment includes a polymer resin polymerized from monomers including the first monomer which is an acrylic monomer substituted with a hydroxy group, the second monomer having an epoxy group, and at least one of the third monomer having a substituted or unsubstituted phenyl group, or the fourth monomer which is an acrylic monomer having a substituted or unsubstituted bicyclic alkyl group, and thus, has excellent chemical resistance and abrasion resistance, so that the ink layer IKL may be effectively protected because there is little damage during the rubbing process.

Hereinafter, the inventive concept will be described in more detail with reference to Examples and Comparative Examples. The following examples are for illustrative purposes only to facilitate the understanding of the inventive concept, and thus, the scope of the inventive concept is not limited thereto.

1. Polymerization of Polymer Resin

Polymerization Example of Polymer Resin

A solvent of ethyl carbitol acetate (ECA) is added to a round flask (2 L), and is maintained at a temperature of 80° C. In a separate vessel, the first to fourth monomers, hydroxypropyl acrylate (HPA), epoxy acrylate, styrene, and isobornyl acrylate (IBOA), (750 g in total) are mixed in the relative mole amounts listed in the Table 1 and stirred, and azobisisobutyronitrile (AIBN), which is a radical initiator, is added to the stirred mixture of monomers. The amount of the initiator is about 0.2 mole percent (mol %) based on the total number of moles of the monomers. Thereafter, the mixture of the monomers and the initiator is added drop wise to the solvent (ECA) over 2 hours. After the monomer mixture is all added, a reaction is maintained for another 4 hours, and then, a cooling process and a filtering process are performed to prepare a polymer resin including a protective layer of an embodiment.

TABLE 1

| | Monomer (moles) | | | | | Glass transition |
|---|---|---|---|---|---|---|
| | HPA | Epoxy Acrylate | Styrene | IBOA | Molecular weight (MW) | temperature (Tg, ° C.) |
| Polymerization Example 1 | 20 | 20 | 0 | 60 | 28,120 | 85 to 88 |
| Polymerization Example 2 | 20 | 20 | 60 | 0 | 27,500 | 85 to 88 |
| Polymerization Example 3 | 20 | 20 | 30 | 30 | 24,450 | 85 to 88 |
| Polymerization Example 4 | 20 | 0 | 40 | 40 | 26,120 | 90 to 92 |
| Polymerization Example 5 | 30 | 20 | 25 | 25 | 25,780 | 80 to 82 |

Table 1 above shows the molecular weight and glass transition temperature of a polymer resin according to the molar ratio of the first monomer to the fourth monomer. The weight average molecular weight of acrylic resins represented by Polymerization Example 1 to Polymerization Example 5 satisfied the range of 20,000 to 30,000 g/mole, and the glass transition temperature satisfied the range of 80° C. to 92° C.

In Polymerization Examples, hydroxypropyl acrylate (HPA), epoxy acrylate (EA), styrene, and isobornyl acrylate (IBOA) were respectively used as the first to fourth monomers.

The structure of epoxy acrylate used in the polymerization example is as follows, and the same is applied hereinafter.

2. Evaluation of Properties of Polymer Resin

TABLE 2

| | Monomer ratio (mole ratio) | | | | | Inorganic particle | Curing agent | Light | Alcohol rubbing | |
|---|---|---|---|---|---|---|---|---|---|---|
| | HPA | EA | Styrene | IBOA | BA | BaSO$_4$ | (Solid 65%) | Trans. (%) | (Number of times) | Cross-cutting |
| Example 1 | 20 | 20 | 30 | 30 | 0 | 3 | 20 | 99 | 170 | 5B |
| Example 2 | 20 | 20 | 30 | 30 | 0 | 3 | 25 | 99 | 200 | 5B |
| Comp. Ex. 1 | 20 | 20 | 30 | 30 | 0 | 3 | 15 | 99 | 120 | 5B |
| Comp. Ex. 2 | 20 | 20 | 30 | 30 | 0 | 3 | 30 | 95 | 140 | 5B |
| Example 3 | 20 | 20 | 30 | 30 | 0 | 3 | 25 | 99 | 200 | 5B |
| Comp. Ex. 3 | 20 | 0 | 0 | 80 | 0 | 3 | 25 | 99 | 150 | 2B |
| Comp. Ex. 4 | 20 | 0 | 80 | 0 | 0 | 3 | 25 | 99 | 170 | 2B |
| Comp. Ex. 5 | 20 | 80 | 0 | 0 | 0 | 3 | 25 | 99 | 220 | 5B |
| Comp. Ex. 6 | 20 | 0 | 30 | 30 | 20 | 3 | 25 | 99 | 110 | 4B |

Table 2 above shows the results of the properties of a polymer resin after preparing the same by mixing monomers, an inorganic particle, and a cross-linking agent in the mole ratios as described. In Examples, hydroxypropyl acrylate (HPA), epoxy acrylate (EA), styrene, and isobornyl acrylate (IBOA) were respectively used as first to fourth monomers. In Comparative Example 6, butyl acrylate (BA) was used. As the cross-linking agent, hexamethylene diisocyanate which protects an isocyanate group with a protection group was used in each of the Examples and Comparative Examples.

The alcohol rubbing evaluation was performed by screen-printing a polymer resin on glass and then curing the printed polymer resin at 150° C. for 30 minutes, followed by leaving the cured polymer resin for 24 hours, and then measuring the number of times of rubbing at which the polymer resin was completely peeled off using an alcohol rubbing machine under a load of 1000 grams (g). If the number of times of rubbing was greater than 150 times, the printed polymer was evaluated and determined to be good, i.e., acceptable.

The cross-cutting evaluation was performed by screen-printing a polymer resin on glass and then curing the printed polymer resin at 150° C. for 30 minutes, followed by leaving the cured polymer resin for 24 hours, and then scratching the same in a lattice of a certain width using a knife. Thereafter, tape was attached on the applied polymer resin and then peeled off at a constant speed. When the result of 4 B or greater was derived, it was evaluated to be good or acceptable, and when the result of 3 B or less was derived, it was evaluated to be poor or unacceptable.

The light transmittance evaluation was performed by screen-printing a polymer resin on a glass and then curing the printed polymer resin at 150° C. for 30 minutes, followed by leaving the cured polymer resin for 24 hours, and then measuring the transmittance of visible light at a wavelength of 540 nm.

Example 1, Example 2, Comparative Example 1, and Comparative Example 2 are examples and comparative examples for determining an appropriate amount or wt % of a cross-linking agent. When the addition of the cross-linking agent was less than 20 wt % based on the total weight of the monomers, one observed a decrease in the alcohol rubbing number—an indication of a reduction in the cross-linking density of the polymer resin and an observed decrease in chemical resistance or greater deterioration of the printed polymer resin. When the addition of the cross-linking agent was greater than 25 wt %, one observed a decrease in the light transmittance of the printed polymer resin.

Example 3, and Comparative Example 3 to Comparative Example 6 are an example and comparative examples for determining the appropriate mole ratio of the monomers. Example 3 showed excellent results in all of the transmittance evaluation, alcohol rubbing evaluation, and cross-cutting evaluation. Referring to Comparative Example 3 and Comparative Example 4, when the second monomer and the third monomer are mixed in a ratio of 80 mol %, one observed a deterioration of cross-cutting properties such that hardness significantly increased resulting in a reduction in durability. Referring to Comparative Example 6, when butyl acrylate was added instead of the second monomer, epoxy acrylate, the alcohol rubbing number decreased indicating a reduction in the chemical resistance of the printed polymer. That is, referring to Comparative Example 6, it can be seen that the polymer resin does not exhibit good properties by simply lowering glass transition temperature (Tg), and that a predetermined amount of the second monomer should be included.

Referring to Comparative Example, 5, although Comparative Example 5 showed excellent results in all of the transmittance evaluation, alcohol rubbing evaluation, and cross-cutting evaluation, the example exhibited poor properties in a yellowing evaluation, see Table 3 below.

TABLE 3

| | Monomer ratio (moles) | | | | Inorg. particle | Curing agent | | Pencil | Cross- |
|---|---|---|---|---|---|---|---|---|---|
| | HPA | EA | Styrene | IBOA | BaSO$_4$ | (Solid 65%) | Yellow | hard. | cutting |
| Example 2 | 20 | 20 | 30 | 30 | 3 | 25 | 0.1 | 3H | 5B |
| Example 4 | 20 | 10 | 35 | 35 | 3 | 20 | 0.1 | 3H | 4B |
| Comp. Ex. 5 | 20 | 80 | 0 | 0 | 3 | 25 | 0.8 | 2H | 5B |
| Comp. Ex. 6 | 20 | 40 | 20 | 20 | 3 | 15 | 0.3 | 3H | 5B |
| Comp. Ex. 7 | 20 | 60 | 10 | 10 | 3 | 30 | 0.6 | 3H | 5B |

Table 3 above shows the results of evaluating the properties of a polymer resin after preparing the same by mixing monomers, inorganic particles, and a cross-linking agent in the mole and weight ratios as described.

The yellowing evaluation was performed by printing a polymer resin on glass, followed by irradiating ultraviolet light (UV A and UV B) on the printed polymer resin for 72 hours, and then measuring the change in color coordinates (Delta E, ΔE). When the change in color coordinates was less than 0.2, it was evaluated to be good or acceptable.

For the evaluation of pencil hardness, pencils of indicated hardness were raised above a polymer resin printed on glass at an angle of 45 degrees, and the polymer resin was scratched at a rate of 100 (millimeters per minute (mm/min) with a force of 1 kilogram (kg) load. Thereafter, the damage to the surface of the polymer resin was visually confirmed and tested. When the polymer resin was scratched with a pencil having a hardness of 2 H, 2 H was indicated, and when scratched with a pencil having a hardness of 3 H, 3 H was indicated.

The cross-cutting evaluation was performed in the same manner as described with reference to Table 2.

Referring to Comparative Example 5 to Comparative Example 7, when the mol % of epoxy acrylate is greater than 40%, the change in yellowing color coordinates ΔE is greater than 0.2. Therefore, it can be determined that when the ratio of epoxy acrylate is about 30 mol % or less, an excellent effect may be achieved.

To summarize the evaluation results of Examples and Comparative Examples shown in Table 2 and Table 3, one observes and can determine that when the polymer resin of an embodiment includes, based on the total of the first monomer to the fourth monomer, the first monomer in a range of 10 mol % to 30 mol %, the second monomer in a range of 10 mol % to 30 mol %, and at least one monomer of the third monomer or the fourth monomer in a range of 50 mol % to 80 mol %, an excellent effect may be achieved. In other words, a screen-printed polymer with the range of mole percent of monomers above exhibits the desired properties of chemical resistance (relatively high alcohol rubbing number), hardness, cross-cutting of 4B or greater, and minimal yellowing. In addition, it can be determined that when a cross-linking agent is added in a weight percent of 20 wt % to 25 wt % based on the total weight of the first monomer to the fourth monomer and the cross-linking agent, an excellent effect may be achieved. Again, a screen-printed polymer with the range of mole percent of monomers above exhibits the desired properties of chemical resistance (relatively high alcohol rubbing number), hardness, cross-cutting of 4 B or greater, and minimal yellowing.

The polymer resin according to an embodiment is polymerized from monomers including a first monomer which is an acrylic monomer substituted with a hydroxy group, a second monomer having an epoxy group, and at least one of a third monomer having a substituted or unsubstituted phenyl group or a fourth monomer which is an acrylic monomer having a substituted or unsubstituted bicyclic alkyl group. Accordingly, excellent durability, abrasion resistance, and chemical resistance may be achieved.

The window module and the display apparatus according to an embodiment include the protective layer containing the polymer resin described above so that the efficiency of a rework process may be increased.

A polymer resin according to an embodiment may have improved chemical resistance and abrasion resistance.

A window module according to an embodiment includes a polymer resin having improved durability, chemical resistance, and abrasion resistance so that the efficiency of a rework process may be increased.

A display apparatus according to an embodiment includes a window module having improved durability, chemical resistance, and abrasion resistance so that the efficiency of a rework process may be increased,

Although the inventive concept has been described with reference embodiments of the inventive concept, it will be understood by those skilled in the art that various modifications and changes in form and details may be made therein without departing from the spirit and scope of the inventive concept as set forth in the following claims. In addition, the embodiments disclosed in the inventive concept are not intended to limit the technical spirit of the inventive concept, and all technical concepts falling within the scope of the following claims and equivalents thereof are to be construed as being included in the scope of the inventive concept.

What is claimed is:

1. A window module comprising:
   a window;
   a first print layer disposed on the window and having an opening to the window;
   an ink layer disposed in the opening and including a base resin and at least one of a pigment or a dye dispersed in the base resin; and
   a protective layer covering the ink layer, wherein the protective layer includes:
   a polymer resin polymerized from monomers comprising a first monomer which is an acrylic monomer substituted with a hydroxy group,
   a second monomer having an epoxy group, and
   at least one of a third monomer having a substituted or unsubstituted phenyl group or a fourth monomer which is an acrylic monomer having a substituted or unsubstituted bicyclic alkyl group,
wherein the ink layer is disposed between the window and the protective layer.

2. The window module of claim 1, wherein the first monomer to the fourth monomer are respectively represented by Formula 1 to Formula 4 below:

Formula 1

Formula 2

Formula 3

Formula 4 in Formula 1 to Formula 4,
$R_1$, $R_5$, and $R_8$ are each independently a hydrogen atom or a methyl group,
each $R_3$, $R_4$, and $R_7$ are independently a hydrogen atom or a methyl group,
$R_2$ is a hydroxy group or a hydroxymethyl group, and
each $R_6$ is independently a hydrogen atom, or a substituted or unsubstituted alkyl group having 1 to 5 carbon atoms.

3. The window module of claim 1, wherein the second monomer is represented by Formula 2-1 below:

Formula 2-1 in Formula 2-1,
$R_9$ is a hydrogen atom or a methyl group, and
$R_{10}$ is a —$CH_2$— group or a —$OCH_2$— group.

4. The window module of claim 1, wherein the polymer resin comprises both the third monomer and the fourth monomer.

5. The window module of claim 1, wherein
the first monomer comprises at least one of hydroxyethyl acrylate, hydroxyethyl methacrylate, or hydroxypropyl acrylate,
the second monomer comprises at least one of a bisphenol-A type epoxy monomer, glycidyl methacrylate, glycidyl acrylate, or allyl glycidyl ether,
the third monomer comprises at least one of isopropenyl benzene or t-butyl styrene, and
the fourth monomer comprises at least one of isobornyl acrylate or isobornyl methacrylate.

6. The window module of claim 1, wherein the polymer resin is polymerized by in the presence of at least one cross-linking agent.

7. The window module of claim 6, wherein the amount of the cross-linking agent based on the total weight of the first monomer to the fourth monomer is 20 weight percent to 25 weight percent.

8. The window module of claim 6, wherein the at least one cross-linking agent comprises an isocyanate group or an amine group through which crosslinking occurs.

9. The window module of claim 1, wherein the protective layer comprises, based on the total moles of the first monomer to the fourth monomer,
the first monomer in a range of 10 mole percent to 30 mole percent,
the second monomer in a range of 10 mole percent to 30 mole percent, and
at least one monomer of the third monomer or the fourth monomer in a range of 50 mole percent to 80 mole percent.

10. The window module of claim 1, wherein the polymer resin further comprises inorganic particles.

11. The window module of claim 10, wherein the inorganic particles comprise particles of barium sulfate.

12. The window module of claim 1, wherein the visible light transmittance of the protective layer at a wavelength of 540 nm is 99% or greater.

13. The window module of claim 1, wherein the ink layer comprises a first portion that fills the opening and a second portion extended from the first portion and disposed on the first print layer.

14. The window module of claim 13, further comprising a second print layer disposed on the first print layer,
wherein at least a portion of the second portion of the ink layer is disposed between the first print layer and the second print layer.

15. The window module of claim 1, wherein the protective layer has a visible light transmittance of 99% or greater.

16. The window module of claim 1, wherein the protective layer and the ink layer together define a semi-transmissive region that selectively transmits infrared light.

* * * * *